United States Patent Office 3,438,956
Patented Apr. 15, 1969

3,438,956
SEPARATION OF MACROMOLECULES HAVING DIFFERENT STEREOREGULARITIES FROM POLYPROPYLENES COMPRISING MIXTURES OF SUCH MACROMOLECULES
Giulio Natta, Milan, Piero Pino, Pisa, and Giorgio Mazzanti, Milan, Italy, assignors to Montecatini Edison S.p.A., Milan, Italy, a corporation of Italy
No Drawing. Continuation-in-part of application Ser. No. 215,475, July 23, 1962, which is a continuation-in-part of applications Ser. No. 514,097, June 8, 1955, and Ser. No. 550,164, Nov. 30, 1955. This application July 23, 1968, Ser. No. 746,767
Int. Cl. C08f 1/94
U.S. Cl. 260—93.7                  15 Claims

ABSTRACT OF THE DISCLOSURE

A process for separating polypropylene into fractions having different percentages of crystallinity due to isotactic structure which process comprises treating polypropylene with a solvent selected from the group consisting of ethyl ether and n-heptane.

---

This application is a continuation-in-part of our application Ser. No. 215,475 filed July 23, 1962, which is itself a continuation-in-part of our applications Ser. No. 514,-097 filed June 8, 1955, and now abandoned, and Ser. No. 550,164 filed Nov. 30, 1955, and now abandoned.

This invention relates to the separation of macromolecules having different stereoregularities from a total polypropylene comprising a mixture of distinct and separable macromolecules, some of which are isotactic macromolecules characterized at normal temperature and pressure conditions by being highly crystalline as determined by X-ray examination, by a high melting point (not lower than 160° C.), and by being nonextractable with boiling n-heptane.

In two papers entitled, respectively, "The Crystalline Structure of a New Type of Polypropylene," and "A New Class of Alpha-Olefin Polymers Having Exceptional Uniformity of Structure," and presented in our behalf at an open meeting of the Accademia Nazionale dei Lincei on Dec. 11, 1954, we disclosed polypropylene which we had discovered to comprise a mixture of three different kinds of distinct and separable linear, regularly head-to-tail macromolecules as follows:

(1) Amorphous atactic macromolecules which we have shown are noncrystallizable under any conditions;

(2) Macromolecules which are partially crystallizable and show some crystallinity (up to about 50%) when subjected to X-ray examination, and which we have shown to be stereoblock macromolecules comprising inseparable chain sections that are atactic and noncrystallizable and chain sections having the stereoregular structure isotactic;

(3) Isotactic macromolecules, that is macromolecules having the stereoregular structure isotactic for substantially the entire length of the macromolecular main chain.

The isotactic structure is a specific type of stereoregular structure which is illustrated in the following model of a portion of an isotactic macromolecule presumed to be fully extended in a plane for convenient illustration of the steric distribution of the substituent groups (methyl groups) bound to the tertiary carbon atoms of immediately succeeding monomer units making up the macromolecular main chain.

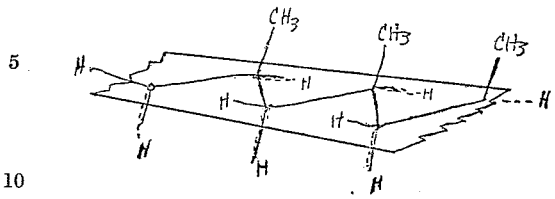

The isotactic structure is characterized in that for at least long stretches of the macromolecules the tertiary carbon atoms of the immediately succeeding monomer units making up the macromolecular main chain have the same steric configuration. That is to say, in said long stretches of the main chain and presuming the chain to be uncoiled from its normal spiral-like configuration and fully extended in the said plane, the methyl groups bound to the tertiary carbon atoms of immediately succeeding monomer units all lie on one side of the plane, and the hydrogen atoms bound to said tertiary carbon atoms lie on the opposite side of the plane. A long chain section in which the methyl groups lie above the plane can be followed by a long chain section in which the positions of the substituents bound to the tertiary carbon atoms are reversed, the methyl groups being disposed below the hypothetical plane, and the hydrogen atoms being disposed above the plane.

We use the terms "noncrystallizable," "partially crystallizable," and "highly crystallizable" to denominate the three different linear, regularly head-to-tail polypropylenes, respectively, because in our terminology those terms have steric structure connotations. As herein used, noncrystallizable denotes a complete lack of stereoregularity in the atactic macromolecules as a consequence of which the atactic (amorphous) macromolecules do not crystallize under any conditions; partially crystallizable denotes the presence of isotactic sections together with atactic sections in the stereoblock macromolecules permitting those macromolecules to crystallize to a limited extent; and highly crystallizable denotes the existence of the isotactic structure for substantially the entire length of the isotactic macromolecules as a consequence of which these macromolecules can crystallize to a high degree under appropriate conditions. Both the stereoblock macromolecules and the isotactic macromolecules are crystalline under normal conditions, the high melting isotactic macromolecules being highly crystalline as determined by X-ray examination.

It should be recognized that partially crystalline and highly crystalline as herein used are relative terms which have meaning in comparing the fractions of different stereoregularities that are separated from the same crude (total) polypropylene. Absolute quantitative percentages of crystallinity as calculated from X-ray diffraction patterns will vary depending upon the catalyst and process conditions used in making the total polymer and the aftertreatments to which it is subjected, including particularly the conditions under which the separate fractions are allowed or induced to crystallize.

As we discovered and disclosed, the three distinctly different polypropylenes comprised in our crude (total) polypropylene have different solubilities in organic solvents as a result of their different stereoregularities, and may be separated as distinct entities by subjecting the polypropylene comprising them to fractionation with solvents which dissolve the undesired macromolecules and leave a residue comprising the desired macromolecules.

As we have disclosed, the atactic macromolecules, which are amorphous and noncrystallizable under any conditions because they lack stereoregularity, are extractable with boiling ethyl ether. By treating the mixture of the different kinds of macromolecules with boiling ethyl ether, we extracted the atactic, amorphous polypropylene and obtained a residue comprising the partially crystallizable (stereoblock) macromolecules and the isotactic macromolecules.

As we have further disclosed, the partially crystallizable polypropylene is extractable with boiling n-heptane. By treating the residue of the boiling ethyl ether extraction with boiling n-heptane we removed the partially crystallizable polypropylene and obtained a residue comprising the isotactic macromolecules nonextractable with boiling n-heptane. It is a characteristic of our isotactic macromolecules that they are nonextractable with boiling n-heptane.

By treating the polypropylene comprising the three distinctly different kinds of macromolecules directly with boiling n-heptane, we removed the atactic noncrystallizable macromolecules and the partially crystalline macromolecules simultaneously, and obtained the isotactic macromolecules nonextractable with boiling n-heptane.

The atactic, amorphous polypropylene has elastomeric properties and is useful as an adhesive.

The residue remaining after the atactic amorphous polypropylene is removed, which comprises a mixture of the partially crystallizable (stereoblock) polypropylene and isotactic polypropylene, is useful for various industrial purposes, including the production of molded objects.

The highly crystallizable, high melting (not lower than 160° C.), plastic isotactic macromolecules nonextractable with boiling n-heptane have numerous important industrial uses, including the production of textile fibers and strong, self-supporting films.

The mixture of three different kinds of polypropylenes occurs as the crude (total) polymerizate obtained by polymerizing propylene in contact with various catalysts, an example of which are catalysts prepared by mixing compounds of transition metals of Groups IV to VI inclusive of the Mendeleeff Periodic Table, with organometallic compounds of metals belonging to Groups I to III inclusive of said Periodic Table.

The relative proportions of the three distinct and separable polypropylenes in the crude (total) polypropylene varies depending on the particular catalyst used.

Certain catalysts, for instance those which are formed when one starting component for the catalyst is a low valency, crystalline, hydrocarbon-insoluble transition metal compound such as $TiCl_3$, and said component is contacted with an aluminum alkyl or with a dialkyl aluminum monohalide, have the capacity to orient the polymerization of propylene directly to a crude polypropylene having a content of isotactic macromolecules which is over 50% and may be as high as 90-95%.

When the crude (total) polypropylene consists prevailingly of isotactic macromolecules and is prevailingly nonextractable with boiling n-heptane, it is not always necessary to subject it first to extraction with solvents for the atactic macromolecules and then to extraction with boiling n-heptane in order to obtain a final polypropylene which is a useful plastic for various purposes. It can be sufficient to remove practically all of the atactic amorphous macromolecules and some of the stereoblock, partially crystallizable macromolecules by washing the crude (total) polypropylene with n-heptane at elevated temperatures which are lower than the boiling point of n-heptane. The n-heptane must be heated, however, and must have a minimum temperature of 40° C., the washing being performed at normal pressure, or under increased or reduced pressure.

When the crude (total) polypropylene comprises oily, low molecular weight macromolecules, these can be removed effectively by treating the crude with boiling acetone prior to effecting the separation of the higher molecular weight atactic, stereoblock, the isotactic macromolecules.

However, the acetone treatment to remove any oily low polymers present is not essential, since the solvents for the atactic amorphous macromolecules of higher molecular weight, and for the stereoblock partially crystallizable macromolecules, are also solvents for the oily low polymers.

If acetone is used to separate oily polymers from the crude (total) polypropylene, the acetone is removed completely from the polypropylene remaining after the oily polymers separation, before the polypropylene is treated for the separation of the atactic macromolecules having relatively high molecular weight, e.g., a molecular weight of 10,000, or of both such atactic macromolecules and the partially crystalline macromolecules from the polypropylene, to obtain a residue comprised essentially of a mixture of the partially crystalline stereoblock macromolecules and the isotactic macromolecules, or comprised essentially of the isotactic macromolecules.

The following technique was used in effecting the extraction of the macromolecules having the different stereoregularities to determine the efficiency of the solvents used and as disclosed herein: the crude (total) polypropylene was extracted by treating a weighed sample thereof with boiling acetone in a thimble placed in a Kumagawa extractor, and once the extraction with the acetone was complete, the sample and thimble were dried carefully to remove any solvent adhering to them, and were again weighed to determine the amount of the polypropylene that had been extracted by the acetone, this treatment excluding the presence of acetone in the subsequent extractions. The same technique was then repeated in the extraction from the sample of the atactic macromolecules and the partially crystalline (stereoblock) macromolecules.

If the crude polypropylene was coagulated in the polymerization reactor by means of methanol, any residual methanol adhering to the polymer was removed completely before the polymer was treated with the solvents for separating the macromolecules having the differnt stereoregularities, no methanol being present when the polymer was subjected to the action of the extracting solvents.

The following examples are given to illustrate the invention which, as will be understood, resides in the separation of the atactic macromolecules, partially crystalline (stereoblock) macromolecules and isotactic macromolecules, from a polypropylene comprising a mixture of those sterically differentiated macromolecules, on the basis of the different solubilities of the macromolecules resulting from their differences in stereoregularity.

Example 1

1.8 g. of $TiCl_4$ dissolved in 50 ml. of anhydrous gasoline (B.P. 98° C.) are added dropwise, at a temperature silghtly lower than room temperature (5°–10° C.), to a solution of 11.4 g. triethyl aluminum in 150 ml. of gasoline. The solution is further diluted to 500 ml. and introduced into an oscillating stainless steel autoclave of about 2 liters capacity, previously thoroughly dried and evacuated. 190 g. of liquid, carefully dried propylene are then pumped in the autoclave and this is heated, while in motion, up to about 55°–60° C. After the pressure has fallen from about 10 to about 2 atm., a further 160 g. propylene are added. The pressure falls now at a lower rate, and after about 20 hours, no further pressure decrease being observed, the residual gases are vented. These latter consist chiefly of propylene (72.5 N liters) and contain a small amount of ethylene (0.2 N liters) probably originating from the decomposition of the catalyst. 95 g. of methanol are then pumped in the autoclave in order to decompose the catalyst; 5.7 liters of gas are evolved, more than 50% of which is propylene. The reaction product, formed of a solid mass drenched with gasoline and methanol, is then extracted.

In order to remove the inorganic compounds originating from the decomposition of the catalyst, the polymer is suspended in di-isopropylether and the suspension is heated while strongly stirring and bubbling through gaseous HCl. After four hours a little methanol is added to the suspension in order to precipitate the polymer which might have been dissolved, and which is then filtered under suction. The polymer, after being dried at 100° C. under reduced pressure, weighs 160 g. and has an ash content of 0.2%. This product appears as a white, spongy solid, which at 140° C. has a transparent rubber-like appearance and at 155° C. is definitely melted. It can be moulded at 130° C. to flexible sheets which, by X-ray diffraction patterns, are shown to contain amorphous and crystalline portions. From the filtered liquid after distillation of the solvent a few grams of a very viscous oil are recovered.

The solid polymer mixture obtained is extracted in succession with boiling acetone, ethyl ether and n-heptane in an extractor of the Kumagawa type and for each solvent the extraction is continued until the percolating solvent does not contain any appreciable quantities of extracted polymer.

The acetone extract consists of oily, low molecular weight products and amounts to 2.8% of the solid polymer obtained. The ether extract, corresponding to 39% of the total polymer, after evaporation of the solvent in vacuum (intrinsic viscosity=1), is completely amorphous similarly to an unvulcanized elastomer. The n-heptane extract, corresponding to 19% of the total polymer (33% of the residue of the ether extraction), after evaporation of the solvent in vacuum, has an intrinsic viscosity of 1.2–1.3 and is, at room temperature, a partially crystalline solid, completely melted at 150° C., which also shows the properties of an elastomer, however up to higher temperatures than the preceding fraction.

The residue insoluble in acetone, ether, and n-heptane (67% of the residue of the ether extraction) has a specific gravity of about 0.92, and an intrinsic viscosity determined in tetrahydronaphthalene solution of 3.33 (100 ml./g.). A 1% solution in tetralin has a specific viscosity of 0.374. Syneresis of this residue starts at 120° C. The polymer loses its crystallinity at about 150° C. and at 170° C. is wholly converted into a transparent, very viscous mass.

By moulding it in a flat press at 140–150° C., plates are obtained which appear crystalline on X-ray examination, show a 700% elongation and a breaking load of 350 kg./sq. cm., referred to the original section. The product extruded when warm (soft plastic mass) and then either warm or cold stretched appears very crystalline and has a very high breaking load. A cold stretched thread of 0.3 mm. diameter after stretching shows, e.g., a breaking load of 32 kg./sq. mm. and an elongation of 40%.

Characteristics similar to those described above, with a lower tensile strength, are exhibited by the residue of the extraction with ether, which has properties intermediate those of the n-heptane extract and those of the n-heptane residue.

By carrying out the polymerization of propylene in the presence of a polymerization agent prepared by reacting in the cold and in the absence of any olefin, tripropylaluminum with titanium tetrachloride, the polymerization product has a much higher average molecular weight, as described in the following example.

Example 2

To a solution of 7.8 g. tripropylaluminum in 70 cc. heptane are added dropwise at 0° C., and under nitrogen, 1.9 g. titanium tetrachloride dissolved in 25 cc. heptane. The suspension is diluted to 200 cc. with heptane and introduced under nitrogen into a 435 cc. autoclave. After adding 102 g. propylene, the autoclave is heated under stirring to 60° C., and is kept for about 40 hours at a temperature between 60 and 68° C. The unreacted gases are then vented and 50 cc. of methanol are pumped into the autoclave to coagulate the polymer. The obtained product is purified as described in Example 1, and 17.2 g. solid polymer are obtained, which are fractionated by hot solvent extraction.

The acetone extract corresponds to 27.6% of the total and comprises semisolid products of low molecular weight.

The ethyl ether extract corresponds to 26.9% of the total and comprises a solid product of gummy appearance having an intrinsic viscosity of 1.57 (molecular weight about 63,000). This fraction is amorphous on X-ray examination.

The n-heptane extract corresponds to 15.1% of the obtained polymer and consists of partially crystalline polypropylene having an intrinsic viscosity of 2.35 (molecular weight about 120,000).

The extraction residue comprises highly crystalline polypropylene having an intrinsic viscosity of 5.1 (molecular weight approximately 390,000).

The obtained product may be easily oriented by hot drawing. Thus without prior removal of the amorphous portions having a lower molecular weight, the polymer mixture may be extruded to form filaments which, after cold stretching, show good mechanical properties.

Example 3

One gram of isopropyl alcohol is added to a solution of 5.7 grams $Al(C_2H_5)_3$ dissolved in 70 ml. gasoline. The resulting mixture is cooled to 0.5° C., and a solution of 1.8 grams $TiCl_4$ in 25 ml. gasoline is added dropwise thereto. The solution is then diluted by adding 100 ml. gasoline and the resulting polymerization initiator is then transferred to a 430 ml. autoclave. 95 grams of propylene are then introduced and the autoclave is kept in motion, while heating the same to 65 to 70° C. until the pressure has decreased from an initial 24 to 17 atmospheres. A second batch of 21 grams propylene is then introduced, with pressure rising to 28 atmospheres and again decreasing gradually to 15 atmospheres, whereupon polymerization is terminated. The unreacted gases which are then drawn from the autoclave contain 9 liters (standard conditions) of propylene. The catalyst is then decomposed by introducing methanol in the autoclave and the reaction product forming a solid mass soaked with gasoline and methanol is discharged.

The polymer is purified by treatment with ether and hydrochloric acid at elevated temperature and then coagulated completely with a large quantity of methanol. After filtration and hot drying under vacuum, the polymer amounts to 96 g. and consists of a white solid product which is fractionated by hot extraction with solvents.

The acetone extract corresponds to 9.30% of the polymer obtained and consists of oily, low molecular products.

The ethyl ether extract corresponds to 43.3% of the polymer obtained and consists of a rubbery, amorphous solid having in tetralin solutions at 135° C. an intrinsic viscosity of 0.3 (corresponding to a molecular weight of about 23,000).

The n-heptane extract corresponds to 18.7% of the polymer obtained and consists of a partially crystalline solid having an intrinsic viscosity equal to 1 (corresponding to a molecular weight of about 32,000). The residue which remains after said extractions corresponds to 30.6% of the total polymer and consists of a powdery, highly crystalline solid having an intrinsic viscosity of 2.7 (corresponding to a molecular weight of about 150,000).

Example 4

Two steel balls, a glass vial containing 7.2 g. of crystalline titanium dichloride and a solution of 11.4 g. of triethyl aluminum in 500 cc. of n-heptane are introduced under nitrogen atmosphere into a 2150 cc. autoclave. The autoclave is then heated to 82° C. and at that temperature 140 g. of pure propylene are introduced. The autoclave is then set in motion in order to break the vial. This leads to the formation of a coarsely dispersed solid polymerizing agent. The autoclave is kept in motion for about 10 hours at 80 to 85° C. Thereafter, the gases are vented and the unpolymerized propylene is collected.

After pumping methanol into the autoclave, the polymer is taken out as a white powder and is purified with acids to eliminate the inorganic products present. About 115 g. of a white powder are obtained with conversion of 82% of the used propylene.

The polymer obtained is fractionated by hot extraction with solvents.

The oily, low molecular weight polymers, 5.8% of the obtained product, are removed by extraction with hot acetone. Extraction of the residue with hot ethyl ether dissolved an amount of polymer (8.3% of the total polymer) which consisted of solid polypropylene, amorphous as determined by X-ray examination, having an intrinsic viscosity of 0.47 in tetralin solution at 135° C.

By hot extraction with n-heptane a fraction was then obtained (corresponding to 10.4% of the total) consisting of polypropylene having an intrinsic viscosity of 0.57 and more than 50% crystalline by X-ray examination. The extraction residue, corresponding to 75% of the total polymer, consists of a highly crystalline polypropylene having an intrinsic viscosity of 1.86.

Example 5

A glass vial containing 2 g. TiCl$_3$ in 30 ml. n-heptane is introduced into a 435 ml. autoclave together with a steel ball (1 inch diameter; to break the vial at the moment the polymerization is to be started). A solution of 5.7 g. triethyl aluminum in 50 ml. n-heptane is then introduced into the autoclave under nitrogen atmosphere and the autoclave is heated up to 70° C. At this moment 103 g. of liquid propylene are admitted and soon afterwards the autoclave is put in motion in order to break the TiCl$_3$ vial.

A slight temperature increase is noticed, while the pressure decreases slowly but continuously. After 6 hours, during which the temperature is kept between 80 and 90° C., when a pressure decrease is no longer observed, 50 ml. methanol are pumped into the autoclave in order to decompose the catalyst, and the residual gases, containing 10 N l. of propylene, are released. From the autoclave a solid, compact mass is discharged, which is first purified as described in the foregoing example and then with concentrated HCl while swelling the mass with boiling toluene. The product is then coagulated with methanol, filtered and washed with methanol and dried by heating under vacuum.

82 g. of polymer are obtained, corresponding to a 79.6% conversion of the employed propylene. Said polymer is made up mostly (85%) of crystalline polypropylene, which may be separated from the non-crystalline products (15%) by extraction with solvents.

The amorphous portion is entirely soluble in acetone; the greatest portion soluble in warm ethyl ether has a softening point of 100° C., an intrinsic viscosity of 0.685 and a molecular weight of about 18,000. The crystalline portion, insoluble in warm n-heptane, has a softening point of 165° C., an intrinsic viscosity of 2.39 and a molecular weight about 120,000.

Example 6

Into a 435 cm.$^3$ oscillating autoclave are introduced two stainless steel balls and a vial containing 1.85 g. (0.012 mole) titanium trichloride; a solution of 3.9 g. tripropyl aluminum in 100 cm.$^3$ heptane is then added under nitrogen. The autoclave is heated to 73° C. and at this temperature 90 g. propylene are introduced. The autoclave is then set in motion so as to break the vial. This leads to the formation of a coarsely dispersed catalytic agent. After 10 hours reaction at a temperature between 70 and 75° C., the reaction product is taken out. It appears as a solid, very compact mass containing a large amount of adsorbed solvent. The purification is carried out by washing with diluted hydrochloric acid, as described previously. 72 g. of a solid white polypropylene are obtained, which are then fractionated by extraction with hot solvents.

The acetone extract corresponds to 3.5% of the obtained polymer and is formed by oily, low molecular weight product.

The ethyl ether extract corresponds to 13.3% of the total, and is formed of a solid amorphous polypropylene, showing an intrinsic viscosity of 0.725 (in tetralin at 135° C.), which corresponds to a molecular weight of about 20,000.

The n-heptane extract corresponds to 11.4% of the total and consists of a polypropylene having an intrinsic viscosity of 0.9, i.e., a molecular weight of about 28,000. On X-ray examination, this fraction appears to consist of polypropylene with a crystallinity higher than 50%.

The extraction residue is 71.8% of the total, and is formed of a highly crystalline polypropylene having an intrinsic viscosity of 3.08, i.e., a molecular weight of about 180,000.

Example 7

3.7 g. titanium trichloride and a solution of 9.9 g. tri-n-butyl-aluminum in 250 ml. heptane are introduced in a 2080 ml. autoclave. 220 g. of a propylene-propane mixture containing 92% propylene are added and the autoclave is heated, under stirring, to 90° C.

At this temperature a rapid pressure fall takes place. The autoclave is kept in motion for 5 hours; the polymerization product is then taken out and 190 g. polypropylene are obtained, which are fractionated by extraction with hot solvents, with the following results:

|  | Percent of the total polymer | Remarks |
| --- | --- | --- |
| Acetone extract | 11 | Amorphous low molecular weight polymers. |
| Ether extract | 20.4 | Solid amorphous polymers. |
| n-Heptane extract | 17.1 | 50% crystalline. |
| Extraction residue | 51.5 | Highly crystalline. |

Example 8

11.4 g. Al(C$_2$H$_5$)$_3$ dissolved in 200 ml. heptane and 200 g. propylene are introduced, under nitrogen, into a 2150 ml. autoclave. After heating under stirring to 81° C., a solution of 0.5 g. titanium tetraisopropylate is injected in the autoclave, which is then kept in motion for about 15 hours at temperatures between 90 and 100° C. The reaction product is purified as usual, and 6 g. of polymer are obtained. These are fractionated by extraction with hot solvents in the usual way, and the following results are obtained:

|  | Percent of the total polymer | Intrinsic viscosity | Remarks |
| --- | --- | --- | --- |
| Acetone extract | 60 |  | Amorphous. |
| Ether extract | 33 | 0.37 | Solid amorphous. |
| n-Heptane extract | 6 | 0.71 | 50% crystalline. |
| Residue | 1 |  | Highly crystalline. |

Example 9

A glass vial containing 7 g. TiCl$_3$ and 3 stainless steel balls are introduced into a 2080 ml. stainless steel autoclave in nitrogen atmosphere. A solution of 1.6 g. (0.013 mole) Al(C$_2$H$_5$)$_2$Cl in 500 ml. n-heptane is then added. After heating to 70° C., 350 g. propylene are injected into the autoclave which is set in motion, thereby breaking the glass vial. After 10 hours at temperatures between 80 and 85° C., during which a continuous pressure fall is observed, the residual gases are vented and 10 N l. propylene are recovered. The solid polymer obtained weighed, after purification in the usual way, 315 g.

The extract with hot acetone is 10.8% of the total polymer. The ethyl ether extract, 16.2% of the total, is an amorphous, solid polypropylene, with intrinsic viscosity=0.43.

The n-heptane extract, 9.5% of the total, has an intrinsic viscosity of 0.955, and has a crystallinity, as detected by X-ray measurements, higher than 50%. The extraction residue, 63.4% of the total polymer, is a highly crystalline polypropylene, with an intrinsic viscosity of 2.05.

Example 10

Into an oscillating autoclave of 1100 cm.$^3$ capacity are introduced two steel balls and a glass vial containing 1.85 g. TiCl$_3$. Under nitrogen atmosphere a solution of 4.95 g. triisobutyl-aluminum in 100 cm.$^3$ heptane is then added. The autoclave is heated to 85° C.; at this temperature 100 g. propylene are introduced and the autoclave is set in motion immediately thereafter. After about 10 hours at temperatures between 70 and 75° C., during which a considerable pressure decrease is noticed, the product is taken out and treated as usual.

65.6 g. polypropylene are obtained, which are fractionated by extraction with hot solvents. The acetone extract corresponds to 5.1% of the total. The ether extract corresponds to 27.4% and consists of a solid, amorphous polypropylene, with an intrinsic viscosity of 0.895. The n-heptane extract corresponds to 14.9% of the total, contains more than 50% crystalline polypropylene, and viscosity of 1.17. The residue is 52.6% of the total and consists of a highly crystalline polypropylene having an intrinsic viscosity of 2.56.

Example 11

3.4 g. titanium tribromide and a solution of 2.85 g. triethyl aluminum in 100 ml. n-heptane are introduced into a 435 ml. autoclave. 115 g. of a propylene-propane mixture, with 91% propylene, are then added. The autoclave is heated to 80–90° C. and kept in motion for about 10 hours.

The polymerization product is purified as in the previous examples and gives 102 g. of a solid polymer, which is fractionated by extraction with hot solvents.

The acetone extract, 10% of the total, consists of oily, low molecular weight polymers. The ethyl ether extract, 36% of the total, is a solid, amorphous polypropylene.

The n-heptane extract, 20% of the total, has a crystallinity, as detected by X-ray measurement, higher than 50%.

The extraction residue, 34% of the total, is a highly crystalline polypropylene.

Example 12

Two steel balls, a glass vial containing 13 g. of titanium tetrabromide and a solution of 11.4 g. of triethyl aluminum in 500 ml. of n-heptane are introduced under nitrogen into an autoclave of 1750 ml. capacity. The autoclave is heated, keeping it motionless, up to 63° C. and at this point 280 g. of propylene are introduced into the equipment. Soon afterwards the autoclave is put in motion, causing in this way the breaking of the vial. The temperature rises now spontaneously in a short lapse of time to 97° C. and drops then again down to 85° C. The autoclave is kept in agitation at this temperature for about ten hours. The unreacted gases are vented and methanol is pumped into the autoclave.

The polypropylene is then purified in the usual manner; 249 g. of polymer are obtained, equal to a conversion of 89% of the monomer employed.

The acetone extract corresponds to 15.1% of the polymer obtained and consists of oily products.

The ether extract corresponds to 33% of the polymer obtained and consists of a rubbery, amorphous solid with intrinsic viscosity of 0.53.

The heptane extract corresponds to 22.1% of the polymer obtained and consists of a partially crystalline solid having an intrinsic viscosity equal to 0.65.

The residue which remains after said extractions corresponds to 30.8% of the polymer obtained and consists of a highly crystalline solid having, in tetralin solutions at 135° C., an intrinsic viscosity equal to 1.78.

Example 13

Two steel balls, a glass vial containing 17 g. of titanium tetraiodide, and a solution of 11.4 g. of triethyl aluminum in 500 ml. of heptane are introduced into an autoclave of 2080 ml. capacity.

The autoclave is heated to 71° C. and at this temperature 268 g. of propylene are introduced and soon afterwards the autoclave is put in motion, causing in this way the breaking of the vial. The temperature rises spontaneously in a short lapse of time up to 100° C. and then drops again down to 90° C. The autoclave is kept in motion for about 6 hours and then the unreacted gases are vented, proceeding afterwards as described in the foregoing examples.

184 g. of propylene polymer are thus obtained, which are fractionated by extraction with hot solvents.

The acetone extract corresponds to 20.4% of the polypropylene obtained and consists of oily, low molecular weight products.

The ether extract corresponds to 22.7% of the polymer obtained and consists of an amorphous solid having, in tetralin solutions at 135° C., an intrinsic viscosity equal to 0.43.

The heptane extract corresponds to 22% of the polymer obtained and consists of partially crystalline solid with intrinsic viscosity of 0.73.

The residue which remains after said extraction corresponds to 35% of the polymer obtained and consists of a powdery, highly crystalline solid having an intrinsic viscosity of 2.16.

Example 14

Into a 435 ml. autoclave two steel balls (1 inch diameter) and a glass vial containing 3.2 g. (i.e., 0.02 mole) of solid vanadium trichloride are introduced. Then a solution of 5.7 g. triethyl aluminum in 100 ml. n-heptane is added under nitrogen. The autoclave is heated to 81° C. and 98 g. pure liquid propylene are introduced; thereafter shaking of the autoclave is started, and continued for about 10 hours at temperatures in the range 81 to 90° C., while a steady, regular pressure decrease may be noticed. After said time, 50 ml. methanol are pumped into the autoclave and 6 N l. of gas are collected. A solid, compact polymer is discharged from the autoclave. It is first broken up in small pieces and then treated with warm ether and hydrochloric acid, finally coagulated with methanol and filtered. Since warm ether does not appreciably swell the obtained polymer, a further purification of the polymer will be necessary, by treating it with warm benzene (whereby it will be entirely swollen) and hydrochloric acid. The polymer is then coagulated with methanol and acetone, filtered, washed and dried by heating it under vacuum, to obtain 64 g. of solid white product. The obtained polymer is fractioned as in the preceding example.

The acetone extract is 12.6% of the obtained polymer and is formed of low molecular weight amorphous polymers.

The ethyl ether extract, 21.4% of the total, is formed of amorphous polypropylene with an intrinsic viscosity of 0.55.

The n-heptane extract, 24.1% of the total, contains more than 50% crystalline polypropylene (on X-ray examination). This fraction has an intrinsic viscosity of 0.85, i.e., a molecular weight of about 25,000.

The extraction residue is a highly crystalline polypropylene having an intrinsic viscosity of 1.78, corresponding to a molecular weight of about 80,000.

Example 15

Into a 435 ml. stainless steel shaking autoclave are placed two steel balls (1 inch diameter) and a glass vail containing 4.3 g. (0.02 mole) $VCl_4$.

The autoclave is then closed and evacuated and a solution of 5.7 g. (0.05 mole) triethyl aluminum in 100 ml. n-heptane is then added under nitrogen pressure. The autoclave is then heated without shaking to 81° C., when 118 g. of pure liquid propylene are introduced. Thereafter the glass vial is broken by shaking the autoclave, which is kept in motion at temperatures varying from 81° to 83° C., while a regular pressure decrease (from 41 to 13 atm.) is noticed. When a pressure decrease is no longer observed, methanol is pumped in the autoclave in order to decompose the catalyst. The autoclave is then vented and 5 N l. of gas are collected. The reaction product appears as a solid, light green mass, drenched with heptane and methanol. In order to purify the polymer from the inorganic products, it is treated with ether and hydrochloric acid, then coagulated with methanol, filtered and washed with methanol. The obtained solid, white polymer is lastly dried by heating under reduced pressure. 77 g. of solid polymer are obtained, which corresponds to 85. 2% of the used propylene. The obtained polymer is fractionated by extracting it in succession with hot acetone, ether and n-heptane.

The acetone extract, 10.1% of the total, consists of low molecular weight, oily polymers. The ether extract, 45.2% of the total, is a solid polypropylene, amorphous by X-ray examination, with an intrinsic viscosity in tetralin solution at 135° C., of 0.82, corresponding to a molecular weight of about 24,000. The heptane extract, 16.45% of the total, is a polypropylene having an intrinsic viscosity of 1.31, i.e., a molecular weight of about 50,000. This fraction is approximately 50% crystalline. The extraction residue is a highly crystalline polypropylene, with an intrinsic viscosity of 1.88.

Example 16

A solution of 11.4 g. triethyl aluminum in 400 cc. n-heptane, and 350 g. of a mixture containing 82% propylene and 18% propane are introduced, under nitrogen, into an autoclave of 2000 cc. capacity. The autoclave is heated under stirring to 80° C., and at this temperature a solution of 6.8 g. $VOCl_3$ in 100 cc. n-heptane is injected.

The temperature rises spontaneously to 87° C., while the pressure falls rapidly. After about 5 hours methanol is pumped into the autoclave, and the polymerization product is taken out. The product is then purified from the inorganic compounds present by heating with ether and hydrogen chloride and complete coagulation with methanol.

172.5 g. polypropylene are obtained, corresponding to 60% of the used propylene. The polymer is then fractionated by extraction with hot solvents.

The acetone extract, 29% of the obtained polymer, is an amorphous, low molecular weight polypropylene.

The ether extract, 29.4% of the total, is an amorphous polypropylene with an intrinsic viscosity of 0.52.

The heptane extract, having a crystallinity of about 50%, shows an intrinsic viscosity of 1.15.

The extraction residue appears on X-ray examination as a highly crystalline polypropylene, and has an intrinsic viscosity of 2.1.

Example 17

Into a stainless steel shaking autoclave of 435 ml. capacity 2 stainless steel balls (1 inch diameter) and a vial containing 3.25 g. $CrCl_3$ (i.e. 0.02 mole) are introduced. Into the closed autoclave a solution of 5.7 g. (i.e. 0.05 mole) triethyl aluminum in 100 ml. n-heptane is added under nitrogen. The autoclave is then heated without shaking to 80° C. and 115 g. pure liquid propylene are introduced. Soon after, shaking is started and continued at temperatures in the range 80° to 110° C.

Forty hours from the start the unreacted propylene is discharged. The reaction product is purified from the catalyst by washing with methanol and hydrochloric acid, and the solvents evaporated.

The obtained polymer is extracted with ether, which dissolves 37% of it; the dissolved fraction is completely amorphous. In the following extraction with boiling n-heptane a fraction corresponding to 44% of the total is dissolved, which is 50% crystalline and shows an intrinsic viscosity of 0.42.

The extraction residue is highly crystalline and has an intrinsic viscosity of 0.765.

Example 18

A glass vial containing 2.36 g. (0.012 mole) $ZrCl_3$, a solution of 2.85 g. triethyl aluminum in 100 cc. n-heptane, and two steel balls are charged into a 435 cc. shaking autoclave under nitrogen atmosphere.

The autoclave is heated, while not in motion, to 73° C. and at this temperature 70 g. of a propylene-propane mixture containing 91% propylene are then added. The autoclave is set in motion immediately thereafter so as to break the vial. After a few hours at 80° C., 7.6 g. of polymer are obtained which are fractionated by extraction with hot solvents.

By extraction with hot ether about 30% of the total product, i.e. the amorphous polypropylene is dissolved. In the following extraction with heptane 10% of the product is dissolved, and is formed of a polypropylene containing more than 50% of crystalline polymer. The extraction residue is a highly crystalline polypropylene.

Example 19

Into a 435 ml. autoclave 2 steel balls and a vial containing 4.7 g. (i.e. 0.02 mole) of $ZrCl_4$ and 5.7 g. triethyl aluminum in 100 ml. n-heptane are introduced, then the autoclave is heated to 79° C. and 106 g. pure liquid propylene are admitted. Shaking of the autoclave is then started and continued at temperatures in the range 80° to 90° C., while a regular pressure decrease is noticed.

When a pressure decrease is no longer observed, methanol is pumped in and the autoclave is vented, 15 N l. of gas being collected. A viscous mass is then discharged, which is purified by treating it as described in the foregoing examples.

72% of the purified product can be extracted with ether and appears completely amorphous when examined under the X-rays. In the following extraction with boiling heptane, a fraction is dissolved which corresponds to 13.8% of the total product. On X-ray examination, this fraction shows a content of crystalline polymer of about 50%; the intrinsic viscosity, in tetralin solution at 135° C., is 0.94. The extraction residue is highly crystalline polypropylene with an intrinsic viscosity of 2.0 (i.e. a molecular weight of about 95,000).

Example 20

By using purified titanium trichloride, with aluminum triethyl or dialkyl Al monochloride, polymers of a higher crystallinity are obtained.

7. g. of $TiCl_3$, purified of the traces of titanium tetrachloride by repeating washing in nitrogen atmosphere with anhydrous n-heptane, are introduced in a 2080 ml. autoclave, 11.4 g. triethyl aluminum in 500 cc. n-heptane and 310 g. pure propylene are added. The autoclave is heated to 80° C. and kept in motion for about 10 hours at this temperature.

The polymerization product is then taken out and purified as in other examples. 240 g. of polypropylene are obtained which are fractionated with hot solvents, with the following results.

|  | Percent of the total | Percent crystalline |
|---|---|---|
| Acetone extract | 3.5 | |
| Ether extract | 3.4 | Amorphous. |
| n-Heptane extract | 4.0 | 50. |
| Extraction residue | 89.1 | Highly crystalline. |

Example 21

Crude polypropylenes obtained by polymerizing propylene in heptane at temperatures between 25° C. and 80° C., under a pressure of 8–10 atmospheres, for a polymerization time of about 30 minutes and in contact with a catalyst obtained by mixing TiCl₄ with triethyl aluminum (Al/Ti molar ratio 5.3) were each extracted with boiling ethyl ether (34° C.). The ether extracts (atactic, amorphous macromolecules) amounted to 46.2% of the total crude polymer.

The residues of the ether extraction, amounting to 53.8% of the total crude in each run (comprising a mixture of stereoblock, partially crystallizable macromolecules and highly crystallizable isotactic macromolecules) were then extracted with boiling n-heptane. The heptane extracts amounted to 16.1% of the total crude in each instance.

Example 22

Runs according to Example 21 were repeated and the crude polypropylenes were each extracted with ethyl ether at 25° C. The ether extracts amounted to 43.3% of the total crude. The residues of the ether extraction amounting to 56.7% of the total polypropylene each comprised a mixture of stereoblock macromolecules and isotactic macromolecules, and were highly crystalline when subjected to X-ray examination.

Example 23

A polypropylene obtained with the aid of a catalyst prepared starting from violet titanium trichloride and aluminum diethyl monochloride is used. This polymer, when extracted with boiling n-heptane, left a residue of 90%.

25 g. portions of the crude polymer were treated with n-heptane at two different temperatures according to the following method.

The samples were put in a round bottom flask provided with stirrer and reflux condenser and were washed three times in succession with 100 g. portions of fresh n-heptane, under stirring. Each washing lasted approximately 10 hours; the n-heptane was siphoned each time from the flask without cooling, the total liquids employed for washing a sample were then combined and evaporated to dryness and the extracted polymer weighed. The residual polymer in the flask was dried by removing the last traces of n-heptane adhering to it under vacuum, and then extracted with boiling ethyl ether, to determine the percentage of atactic polypropylene still left in it.

The results are shown in the table:

| Washing temperature, °C. | Percent of polymer washed out | Percent atactic in residue |
|---|---|---|
| 50 | 7.2 | 0.35 |
| 75 | 8.6 | 0.2 |

Example 24

A crude polymer of propylene obtained at 90° C. with the aid of a catalyst prepared starting from titanium trichloride and aluminum triethyl and purified from catalyst residues in the usual way is exhaustively extracted with boiling n-heptane.

The residue after the extraction corresponds to 66% of the crude and consists essentially of isotactic polypropylene, i.e. of polypropylene made up of isotactic macromolecules.

Example 25

A polypropylene prepared with the aid of a catalyst obtained from TiCl₄ and triethyl aluminum and from which catalyst residues were eliminated in the usual manner, was exhaustively extracted with boiling n-heptane in a Kumagawa extractor. The residue corresponds to 27% of the crude and consisted essentially of isotactic macromolecules.

The presence of the isotactic structure in the partially crystalline (stereoblock) macromolecules and in the isotactic macromolecules is established by data as disclosed by us previously, for instance in our applications Ser. Nos. 514,097, 514,098, and 514, 099, filed June 8, 1955, and including X-ray and infrared data.

The stereoblock partially crystallizable macromolecules containing atactic noncrystallizable chain sections and crystallizable isotactic chain sections can be characterized by and are distinguished from the isotactic macromolecules by their extractability with boiling n-heptane.

The relative proportions of the stereoblock macromolecules and isotactic macromolecules in the residue remaining after treating the total mixture of macromolecules with boiling ethyl ether for the atactic, amorphous macromolecules will depend on the relative proportions of those two different kinds of macromolecules in the starting mixture. The residue of the ether extraction can contain, for instance, from about 13% to about 35% of the stereoblock macromolecules and, conversely, from about 87% to about 65% of isotactic macromolecules.

The term "heated" as applied to n-heptane in the foregoing specification means at a temperature of from at least 40° C. to 98° C. or from 80° C. to 98° C.

We claim:

1. The process for recovering distinct, sterically differentiated macromolecules selected from the group consisting of (1) substantially linear, regularly head-to-tail amorphous, atactic polymers of propylene; (2) substantially linear, regularly head-to-tail partially crystalline polymers of propylene, and (3) polymers of propylene consisting essentially of isotactic macromolecules non-extractable with boiling n-heptane, from a solid polymerizate comprising a mixture of said, distinct, sterically differentiated polymers, which process comprises subjecting the solid propylene polymerizate to fractional dissolution with boiling n-heptane to dissolve substantially linear, head-to-tail amorphous polymers of propylene and substantially linear, head-to-tail partially crystalline polymers of propylene, and separating the dissolved polymers from the polymers consisting essentially of isotactic macromolecules non-extractable with boiling n-heptane.

2. A process for separating polypropylene into fractions having different percentages of crystallinity due to isotactic structure which comprises treating said polypropylene with a solvent selected from the group consisting of ethyl ether and n-heptane to produce a residue of polypropylene which has a higher percentage of crystallinity due to isotactic structure than the untreated polypropylene and a solution of polypropylene, which polypropylene has a lower percentage of crystallinity due to isotactic structure than said untreated polypropylene.

3. The process according to claim 2 wherein the untreated polypropylene is obtained by polymerizing propylene with a catalyst consisting essentially of the reaction product of a titanium halide and an organo-aluminum compound containing at least one metal-to-hydrocarbon bond.

4. The process according to claim 2 wherein the solvent is ethyl ether.

5. The process according to claim 4 wherein the ethyl ether is at a temperature of from about 25° C. to the boiling point of ethyl ether.

6. The process according to claim 2 wherein the solvent is n-heptane.

7. The process according to claim 6 wherein the n-heptane is at a temperature of from about 40° C. to about 98° C.

8. The process according to claim 6 wherein the n-heptane is at a temperature of from about 80° C. to about 98° C.

9. The process according to claim 6, characterized in that the polypropylene is treated with boiling n-heptane.

10. The process for separating from a mixture thereof three distinct sterically differentiated substantially linear head-to-tail polypropylene fractions as follows:
   (a) atactic polypropylenes;
   (b) stereoblock polypropylene, the macromolecules of which comprise atactic and isotatic sections; and
   (c) isotactic polypropylene consisting essentially of isotactic macromolecules:

which process comprises subjecting said mixture to fractional dissolution with ethyl ether to produce a solution containing said atactic polypropylene and a residue; subjecting the said residue to fractional dissolution with boiling n-heptane to produce a solution containing said stereoblock polypropylene and a second residue consisting of said isotactic polypropylene and separating said second residue.

11. The process according to claim 10, characterized in that the polypropylene comprising the mixture of the three kinds of macromolecules is first treated with boiling ether, the dissolved atactic macromolecules are separated from the undissolved residue, the residue is then treated with boiling n-heptane, and the macromolecules thus dissolved are separated from the undissolved residue of the boiling n-heptane treatment.

12. The process for separating atactic polypropylene from mixtures thereof with stereoblock polypropylene and isotactic polypropylene, which process comprises subjecting said mixture to the action of ethyl ether to dissolve said atactic polypropylene and separating a residue containing said stereoblock polypropylene and said isotactic polypropylene.

13. The process for separating isotactic polypropylene from mixtures thereof with atactic polypropylene and stereoblock polypropylene which process comprises subjecting said mixture to the action of boiling n-heptane to dissolve said atactic polypropylene and said stereoblock polypropylene and separating a residue consisting of said isotactic polypropylene.

14. The process for recovering isotactic polypropylene consisting essentially of isotactic macromolecules, from a crude polypropylene comprising isotactic macromelecules, which process comprises treating crude polypropylene with n-heptane maintained at a temperature of from about 40° C. to about 98° C.

15. A process for separating polypropylene into fractions of different degree of crystallinity which comprises extracting a polypropylene, said polypropylene being obtained on polymerization of propylene with a catalyst consisting essentially of the reaction product of titanium halide and an organo-aluminum compound containing at least one metal-to-hydrocarbon bond, with ethyl ether and recovering a residue of polypropylene which is more crystalline than the original polypropylene, and a solution of polypropylene which is less crystalline than the original polypropylene.

References Cited

UNITED STATES PATENTS 2,825,721  3/1958  Hogan et al. _____ 260—94.9

FOREIGN PATENTS 789,781  1/1958  Great Britain.

OTHER REFERENCES

Gaylord et al.: Linear and Stereoregular Addition Polymers, pp. 161–162, Interscience Publishers, Inc., New York (1959).

JOSEPH L. SCHOFER, *Primary Examiner.*

J. C. HAIGHT, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,438,956                          April 15, 1969

Giulio Natta et al.

It is certified that error appears in the above identified patent and that said Letters Patent are hereby corrected as shown below:

Column 14, line 45, after "solid" insert -- propylene --.

Signed and sealed this 7th day of April 1970.

(SEAL)
Attest:

Edward M. Fletcher, Jr.                         WILLIAM E. SCHUYLER, JR

Attesting Officer                                  Commissioner of Patents